US010503695B2

(12) United States Patent
Zhai et al.

(10) Patent No.: US 10,503,695 B2
(45) Date of Patent: Dec. 10, 2019

(54) METHOD AND APPARATUS FOR FILE SYSTEM

(71) Applicant: EMC Corporation, Hopkinton, MA (US)

(72) Inventors: Jia Zhai, Beijing (CN); Yingchao Zhou, Beijing (CN); Wengang Wang, Beijing (CN); Jun Guo, Beijing (CN); Sen Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 449 days.

(21) Appl. No.: 14/495,404

(22) Filed: Sep. 24, 2014

(65) Prior Publication Data

US 2015/0095383 A1    Apr. 2, 2015

(30) Foreign Application Priority Data

Sep. 27, 2013 (CN) .......................... 2013 1 0466056

(51) Int. Cl.
*G06F 17/30* (2006.01)
*G06F 7/00* (2006.01)
*G06F 16/17* (2019.01)
*G06F 3/06* (2006.01)

(52) U.S. Cl.
CPC ........ *G06F 16/1727* (2019.01); *G06F 3/0608* (2013.01); *G06F 3/0665* (2013.01); *G06F 3/0683* (2013.01)

(58) Field of Classification Search
USPC ........................................................ 707/823
See application file for complete search history.

(56) References Cited

U.S. PATENT DOCUMENTS

| | | | | |
|---|---|---|---|---|
| 6,834,326 B1* | 12/2004 | Wang | ................. | G06F 11/1076 370/355 |
| 8,935,499 B2* | 1/2015 | Chhaunker | ............. | G06F 12/00 711/161 |
| 9,880,928 B1 | 1/2018 | Bono et al. | | |
| 2002/0161911 A1* | 10/2002 | Pinckney, III | ..... | H04N 7/17336 709/231 |
| 2008/0052329 A1* | 2/2008 | Dodge | ................. | G06F 3/0608 |
| 2011/0066668 A1* | 3/2011 | Guarraci | ........... | G06F 17/30233 707/831 |

FOREIGN PATENT DOCUMENTS

| | | |
|---|---|---|
| CN | 1489334 | 4/2004 |
| CN | 1694177 | 11/2005 |

* cited by examiner

*Primary Examiner* — Kuen S Lu
(74) *Attorney, Agent, or Firm* — BainwoodHuang

(57) ABSTRACT

The present disclosure relates to a method and apparatus for a file system, the file system comprising at least a first logical storage area and a second logical storage area, a logical block of the first logical storage area and that of the second logical storage area being different in size, and in response to a request for creating a file, selecting a logical storage area for storing the file from the at least first logical storage area and second logical storage area; and storing the file in the selected logical storage area. According to the above various embodiments of the present invention, a direct and effective way may be used to support variable-length block size in a file system, without increasing metadata and positioning overheads.

19 Claims, 4 Drawing Sheets

METHOD AND APPARATUS FOR FILE SYSTEM

RELATED APPLICATION

This Application claims priority from Chinese Patent Application Serial No. CN201310466056.1 filed on Sep. 27, 2013 entitled "METHOD AND APPARATUS FOR FILE SYSTEM," the content and teachings of which are hereby incorporated by reference in their entirety.

FIELD

Embodiments of the present invention relate to the field of file systems, and more specifically, to a method and apparatus for a file system.

BACKGROUND

With the constant development of computer technology, there has been an increased demand for change on requirements on file systems. Usually a file system manages file storage by maintaining a logical storage block, the logical storage block corresponding to a physical storage block that is used for actual file storage. In practice, variable file block size is of considered as an important factor in designing and implementing a file system. Specifically, variable file block size can decrease the occupation of metadata, improve the I/O performance and reduce fragments.

However, though most modern file systems can support different block size, in general only one block size will be used while creating the file system and the block size typically cannot be changed during the lifecycle of the file system. Therefore, in the prior art there lacks a flexible and efficient management style of file systems, and it becomes difficult to take full advantage of the flexibility of file systems.

SUMMARY

To this end, the present disclosure proposes a technology for file systems.

According to one aspect of the present disclosure, there is provided a method for a file system, the file system comprising at least a first logical storage area and a second logical storage area, a logical block of the first logical storage area being different in size from that of the second logical storage area, and further in response to a request for creating a file, selecting a logical storage area for storing the file from the at least first logical storage area and second logical storage area; and storing the file in the selected logical storage area.

According to a further embodiment of the present invention, a storage area for storing the file is selected from the at least first logical storage area and second logical storage area based on attributes of the file, for example a file type and/or file size. According to a yet a further embodiment of the present invention, types of the file comprise one or more of video files, audio files, text files, image files, and other types of files.

According to a further embodiment of the present invention, storing the file in the selected logical storage area further comprises selecting a location for storing the file in the selected logical storage area; allocating a physical storage block with corresponding size from a physical storage pool; and writing the file's contents into the allocated physical storage block. According to a further embodiment of the present invention, the file system further comprises a mapping table for recording a correspondence relationship between the logical storage area and the physical storage block, and storing the file in the selected logical storage area further comprises updating a block map table based on the correspondence relationship between the logical storage area and the physical storage block.

According to further aspect of the present invention, there is provided an apparatus for a file system, the file system comprising at least a first logical storage area and a second logical storage area, a logical block of the first logical storage area being different in size from the second logical storage area, the apparatus further comprising: a logical unit configured to, in response to a request for creating a file, the logical unit configured to select a logical storage area for storing the file from the at least first logical storage area and second logical storage area; and a further configured to store the file in the selected logical storage area.

According to a further embodiment of the present invention, the apparatus is configured to select a storage area for storing the file from the at least first logical storage area and second logical storage area based on a type and/or file size of the file and types of the file comprise one or more of: video files, audio files, text files, image files etc.

According to yet a further embodiment of the present invention, the apparatus further configured to select a location for storing the file in the selected logical storage area; and further configured to allocate a physical storage block with corresponding size from a physical storage pool; and further configured to write the file's contents into the physical storage block. According to a further embodiment of the present invention, the file system further comprises a mapping table for recording a correspondence relationship between the logical storage area and the physical storage block, and further configured to update a block map table based on the correspondence relationship between the logical storage area and the physical storage block.

According to a further embodiment of the present invention, there is provided a file system comprising at least a first logical storage area and a second logical storage area, a logical block of the first logical storage area being different in size from of the second logical storage area, the file system comprising an apparatus for a file system as described above.

According to the various embodiments of the present invention disclosed herein, a direct and effective way may be used to support variable-length block size in a file system, without increasing metadata and positioning overheads. The configurable policy engine further makes it possible to control block size more easily and directly. Therefore, better data integration and higher usability are provided.

It should be obvious to one skilled in the art that the flowchart and block diagrams in the Figures illustrate the architecture, functionality, and operation of possible implementations of systems, methods and computer program products according to various exemplary embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DETAILED DESCRIPTION

Principles and spirit of the present invention will be described below with reference to the accompanying drawings, in which several exemplary embodiments have been illustrated. These embodiments are presented only to enable those skilled in the art to better understand and further implement the present invention, rather than limiting the scope of the present disclosure in any way.

Figure 1:
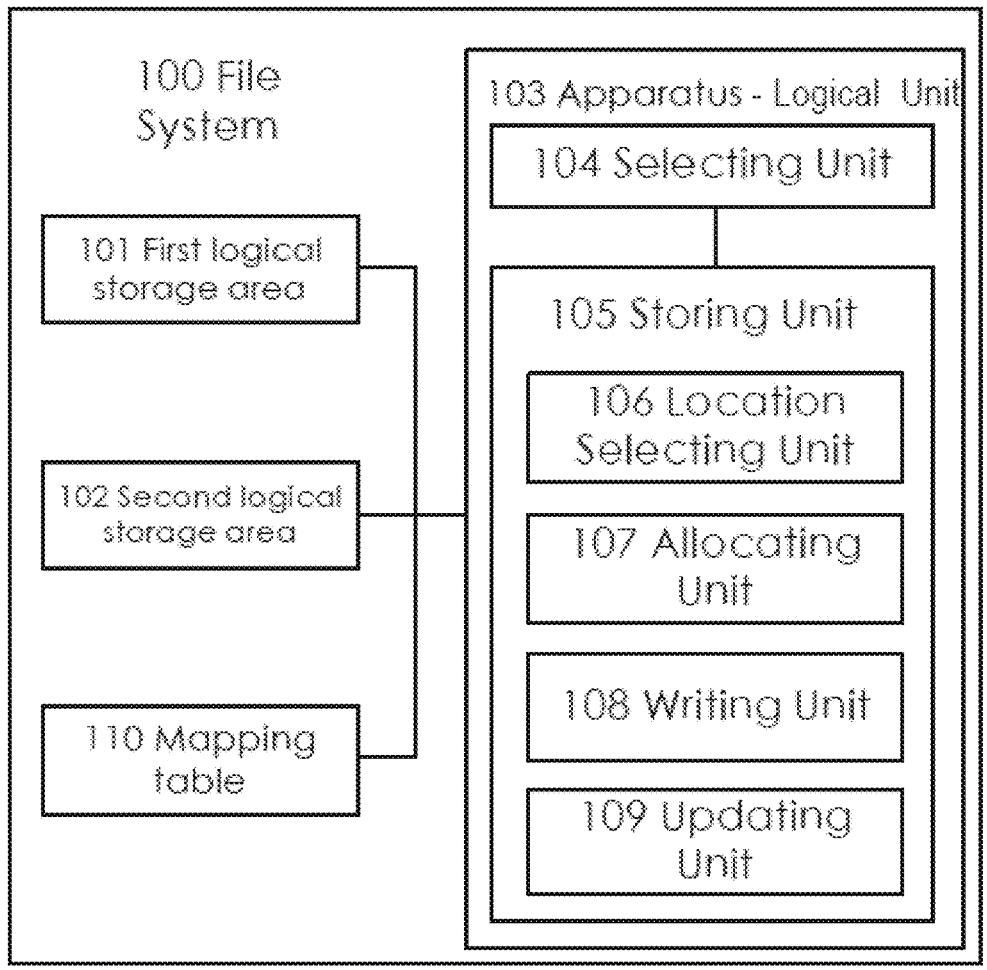
FIG. 1 shows an exemplary block diagram of a file system 100 containing an apparatus for a file system according to one exemplary embodiment of the present invention.

Reference is made to FIG. 1, which shows an exemplary block diagram of a file system 100 where an apparatus for a file system according to one embodiment of the present invention is contained.

Figure 2:
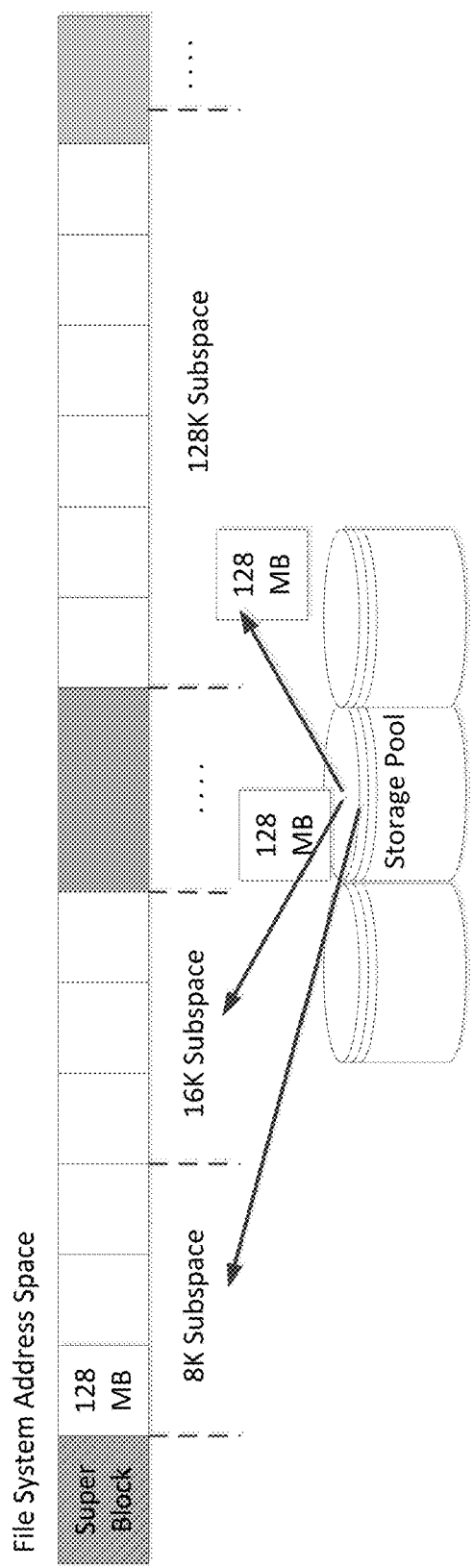
FIG. 2 shows a concrete example of a file system address space according to one exemplary embodiment of the present invention.

As shown in this figure, file system 100 at least contains a first logical storage area 101 and a second logical storage area 102. A logical block of the first logical storage area 101 being different in size from that of the second logical storage area 102. Note in addition to first logical storage area 101 and second logical storage area 102, file system 100 may further include other logical storage area having other/different size (i.e. different block size than first and second logical storages). The present disclosure should not be construed to be limiting in this regard. Furthermore, although logical storage areas 101 and 102 have different logical block size, they have fixed physical storage block size. In file system 100 according to the present disclosure, the file system address space is a virtual space, i.e. no physical storage is provisioned to the file system (except for minimal necessary space such as super block) when it is created at the first time. Therefore, the virtual address space is divided into quite a few subspaces; each subspace is corresponding to a different logical block size. To clearly illustrate file system 100, reference is now made to FIG. 2. This figure shows a concrete example of a file system address space according to one exemplary embodiment of the present invention. As shown in FIG. 2, the file system address space further includes multiple subspaces having different logical block size, such as an 8K subspace, a 16K subspace, . . . , a 128K subspace, etc. The 8K subspace contains multiple logical blocks having 8K block size; the 16K subspace contains multiple logical blocks having 16K block size . . . ; the 128K subspace contains multiple logical blocks having 128K block size, etc. Those skilled in the art should understand that the 8K subspace, 16K subspace, . . . , 128K subspace are merely examples; and file system 100 according to the present disclosure can be divided into subspaces having other size. The scope of the present disclosure is not limited in this regard. To enable each subspace to solve all physical storages, preferably 64 bit FSBN numbers are used. Likewise, 64 bit is also exemplary, and those skilled in the art should understand FSBN numbers of more or less bits can be used as part of the present disclosure. The physical storages, on the other hand, are divided into fixed-sized slices (for example 128 MB per slice). The term "slice" is the unit of physical storages provided to the file system. Slices represent contiguously addressable ranges of physical storages on a particular device.

Returning to FIG. 1, file system 100 according to the present disclosure further comprises an apparatus 103 for the file system that essentially has a logical unit to perform associated tasks. Described herein are various separate units that individually perform tasks and eventually make-up the logical unit or in a separate embodiment the logical unit can be a combination of each of these units put together and the logical unit can singly perform the tasks that each of the units below depicted can perform.

Apparatus 103 mainly includes a logical unit that further comprises a selecting unit 104 and a storing unit 105, wherein selecting unit 104 is configured to, in response to a request for creating a file, select a logical storage area for storing the file from at least first logical storage area 101 and second logical storage area 102. In an optional embodiment, selecting unit 104 is configured to select a storage area for storing the file from at least first logical storage area 101 and second logical storage area 102 based on a file type and/or file size as one of the parameters. It should be obvious that other file related attributes can also be used as parameters in the selection process. The file types may be one or more of video files, audio files, image files, text files etc. In an optional implementation of the present disclosure, a policy engine can be used to retain user configurations, which may be consulted while determining a newly created file's logical block size. Those skilled in the art should understand the policy engine is merely one example of implementations and is not intended to limit the spirit and scope of the present disclosure. After selecting a logical storage area for storing the file, storing unit 105 stores the file in the selected logical storage area.

Specifically, in one embodiment of the present invention, storing unit 105 may comprise: a location selecting unit 106, an allocating unit 107 and a writing unit 108. Selecting unit 106 is configured to select a location for storing the file in the selected logical storage area; while allocating unit 107 is configured to allocate a physical storage block with corresponding size from a physical storage pool; and writing unit 108 is configured to write the file's contents into the physical storage block. Note units 106 to 108 are not essential but optional, and as disclosed previously a single logical unit may be configured to perform the tasks of each of these separate units.

Figure 3:
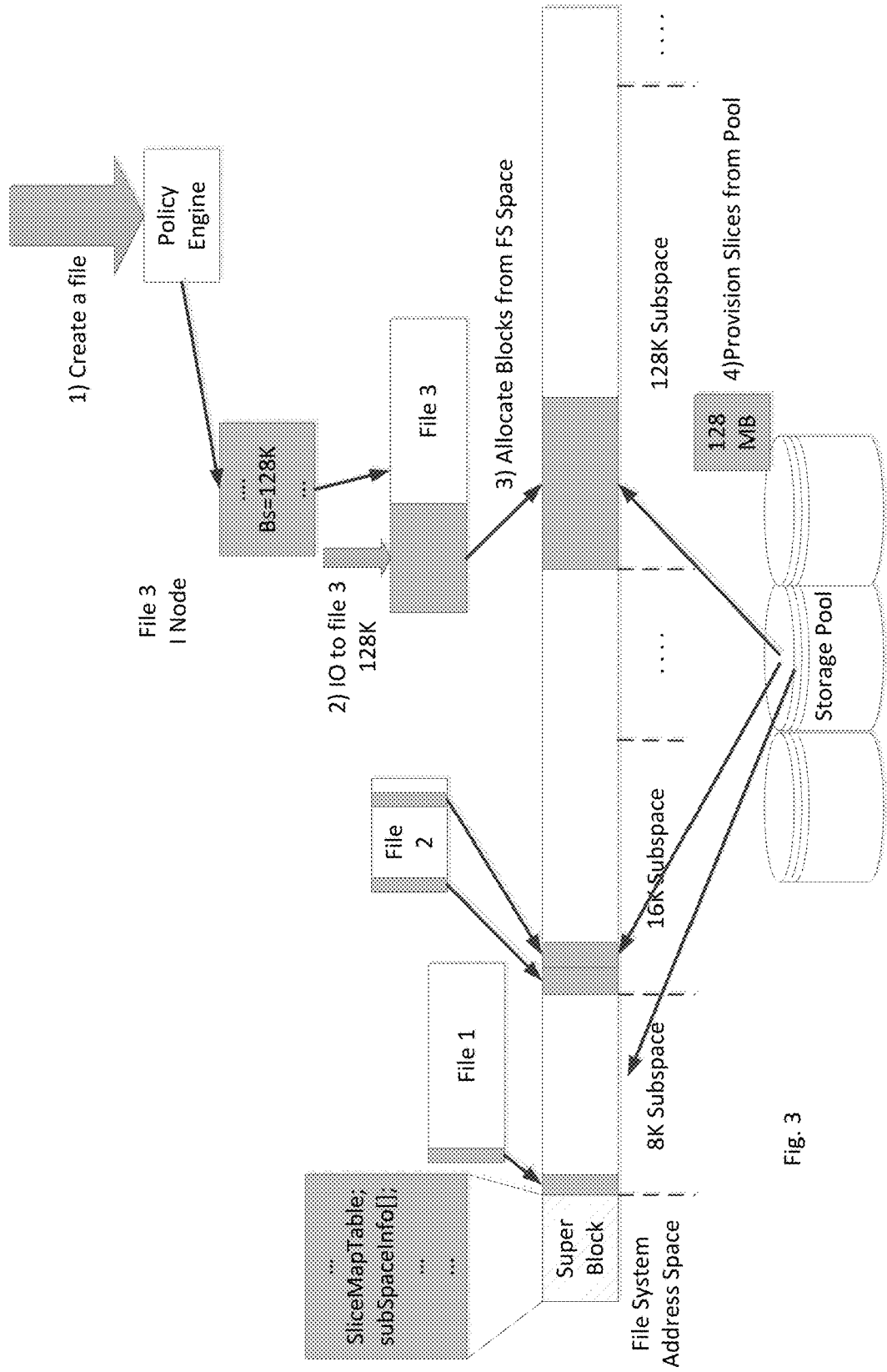
FIG. 3 shows a concrete example of creating a file in a file system according to one exemplary embodiment of the present invention.

To clearly illustrate the above apparatus and units, further illustration is presented in conjunction with FIG. 3. This figure shows a concrete example of creating a file in a file system according to one exemplary embodiment of the present invention. Those skilled in the art should understand the concrete implementation of storing a file to be described with reference to FIG. 3 below is only exemplary and should not be construed as limiting the spirit and essence of the present invention. As shown in FIG. 3, when creating a "file 3" (illustrated as ① in FIG. 3), logical block size used (or suitable) for storing the size is determined by the policy engine. In the example in FIG. 3, determined logical block size suitable for storing "file 3" is for example 128 KB. The determined logical block size may be recorded in an "I node" node i (a metadata node) in an optional implementation. Later, the file system receives data sent for I/O operations (illustrated as ② in FIG. 2). The file system tries to allocate blocks from the subspace (subspace with logical block size of 128 KB) corresponding to the block size (illustrated as ③ in FIG. 3). Note the size of the file system may be the same as or different from the size of the storage pool. In the description of the present disclosure, it is not intended to limit the size of the storage pool for the sake of convenience, so long as it can be ensured that the required size of the file system can be met. Nevertheless, it should be stressed that the size of a file system is determined when the file system is being created, whereas the actual physical storage being occupied is allocated during usage (for example, during an I/O operation). In one exemplary implementation, in the super block of the file system usage of each slice can be recorded (e.g. 128 MB slice) in each subspace, including the consumed and remaining units. In one subspace, if all requested slices are used up (or only a few requested slices are left and thus not sufficient to support I/O operations) how many physical blocks has been actually consumed in that sub space, the file system is asked to provision a new slice from the physical storage pool in following steps (illustrated as ✹ in FIG. 3):

a. choosing a position in the file system subspace;
b. allocating a free slice from the physical storage pool;
Optionally, the implementation shown in FIG. 3 may further comprise:
c. filling the physical storage slice information in the super block's "Slice Map Table", thereby maintaining a mapping relationship between physical storage blocks and logical storage blocks.

Thus, after calculating the offset of data on physical storage from the "Slice Mapping Table", the actual I/O operations can be performed.

Alternatively or additionally, storing unit 105 may further comprise an updating unit 109 configured to update a mapping table 110 based on a correspondence relationship between the logical storage area and the physical storage block.

Likewise, through a similar process "file 1" and "file 2" shown in FIG. 3 are determined to be stored in the 8 KB logical block subspace and the 16 KB logical block subspace respectively, which is not detailed here, but should be obvious from the discussion above.

Note the term "unit" used here may be either a hardware module or a software unit module or a combination thereof. Accordingly, apparatus 103 (logical unit) may be implemented in various manners. For example, in some embodiments, apparatus 103 may be implemented using software and/or firmware completely or partially, for example, implemented as a computer program product embodied in a computer readable medium or purely as software or purely in terms of hardware or a combination thereof. Alternatively or additionally, apparatus 100 may be implemented based on hardware partially or completely, for example, implemented as integrated circuit (IC), application-specific integrated chip (ASIC), system on chip (SOC), field programmable gate array (FPGA), etc. The scope of the present disclosure is not limited in this regard.

According to the above various embodiments of the present invention, a direct and effective way may be used to support variable-length block size in a file system, without increasing metadata and positioning overheads. The physical storages are allocated on demand, which minimizes space fragments. The configurable policy engine further makes it possible to control block size more easily and directly. Therefore, better data integration and higher usability are provided.

Figure 4:
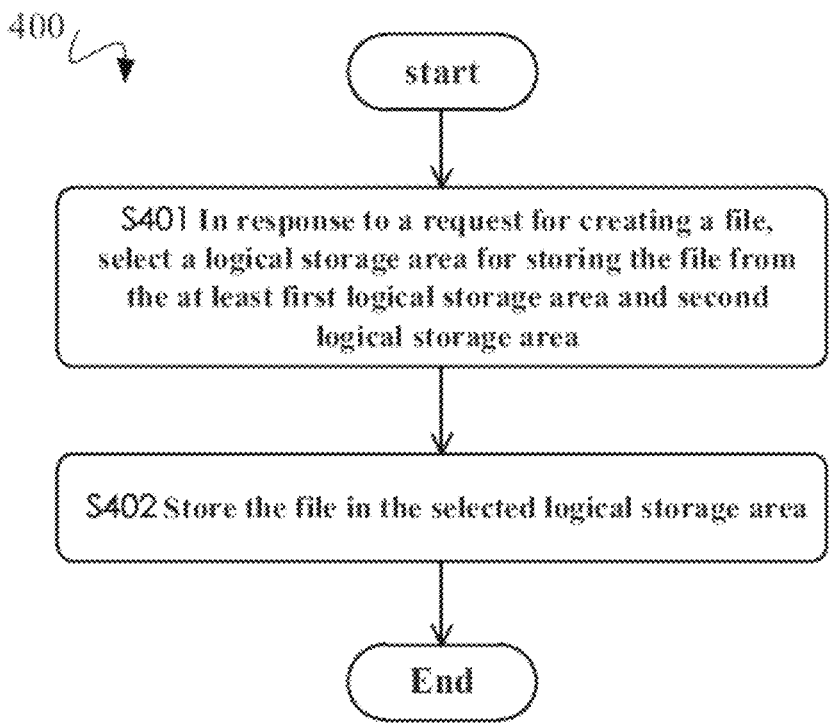
FIG. 4 shows a flowchart of a method 400 for a file system according to one exemplary embodiment of the present invention.

Reference is now made to FIG. 4, which shows a flowchart of a method 400 for a file system according to one exemplary embodiment of the present invention. The file system comprises at least a first logical storage area and a second logical storage area, a logical block of the first logical storage area being different in size from of the second logical storage area. It should be understood that the steps recorded in method 400 may occur in a different order and/or concurrently. Method 400 may further comprise additional and/or omitted steps. The scope of the present invention is not limited in this regard. Those skilled in the art should understand that in the following illustration of method 400, terms similar to above denote like meaning for the sake of conciseness.

After method 400 starts, in step S401 in response to a request for creating a file, a logical storage area for storing the file is selected from the at least first logical storage area and second logical storage area.

Next, method 400 proceeds to step S402 where the file is stored in the selected logical storage area.

According to one embodiment of the present invention, a storage area for storing the file is selected from the at least first logical storage area and second logical storage area based on a file type and/or file size or other identifiable parameters associated with a file. According to a further embodiment of the present invention, types of the file comprise one or more of: video files, audio files, image files, text files etc.

In a further embodiment of the present invention, step S402 further comprises: selecting a location for storing the file in the selected logical storage area; allocating a physical storage block with corresponding size from a physical storage pool; writing the file's contents into the physical storage block.

According to one embodiment of the present invention, the file system further comprises a mapping table for recording a correspondence relationship between the logical storage area and the physical storage block, and step S402 further comprises updating a block map table based on the correspondence relationship between the logical storage area and the physical storage block.

Figure 5:
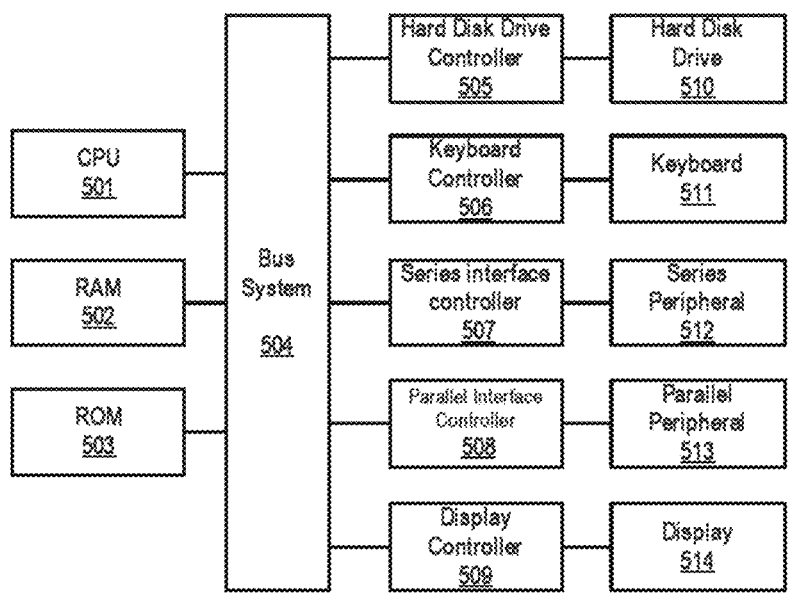
FIG. 5 shows an exemplary schematic block diagram of a computer system 500 which is applicable to implement the embodiments of the present invention.

FIG. 5 illustrates a schematic block diagram of a computer system 500 which is applicable to implement the embodiments of the present invention. As illustrated in FIG. 5, computer system 500 may include: CPU (Central Process Unit) 501, RAM (Random Access Memory) 502, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513 and Display 514. Among above devices, CPU 501, RAM 502, ROM 503, Hard Drive Controller 505, Keyboard Controller 506, Serial Interface Controller 507, Parallel Interface Controller 508 and Display Controller 509 are coupled to the System Bus 504. Hard Drive 510 is coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508. And, Display 314 is coupled to Display Controller 509.

It should be understood that the structure as illustrated in FIG. 5 is only for the exemplary purpose rather than any limitation to the present invention. In some cases, some devices may be added to or removed based on specific situations.

Specifically, in addition to hardware embodiments, the embodiments of the present invention may further be implemented in the form of a computer program product. For example, method 400 described with reference to FIG. 4 may be implemented by a computer program product. The computer program product may be stored in RAM 502, ROM 503, Hard Drive 510 as shown in FIG. 5 and/or any appropriate storage media, or be downloaded to computer system 500 from an appropriate location via a network. The computer program product may include a computer code portion that comprises program instructions executable by an appropriate processing device (e.g., CPU 501 shown in FIG. 5). The program instructions at least may comprise: instructions for causing one or more entities to execute a task set comprising multiple tasks, each of the multiple tasks being used for accessing the storage system as disclosed in the method 400 of FIG. 4.

The spirit and principles of the present invention have been illustrated in conjunction with several concrete exemplary embodiments. According to the embodiments of the present invention, performance of the storage system can be obtained more pertinently and efficiently so as to better utilize the storage system.

Note the embodiments of the present invention can be implemented in software, hardware or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate the above system and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The system of the present disclosure can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

Note although several means or submeans of the system have been mentioned in the above detailed description, such division is merely exemplary and not mandatory. In fact, according to the embodiments of the present invention, the features and functions of two or more means described above may be embodied in one means. On the contrary, the features and functions of one means described above may be embodied by a plurality of means.

In addition, although in the accompanying drawings operations of the method of the present disclosure are described in specific order, it is not required or suggested these operations be necessarily executed in the specific order or the desired result be achieved by executing all illustrated operations. On the contrary, the steps depicted in the flowcharts may change their execution order. Additionally or alternatively, some steps may be omitted, a plurality of steps may be combined into one step for execution, and/or one step may be decomposed into a plurality of steps for execution.

Although the present disclosure has been described with reference to several embodiments, it is to be understood the present disclosure is not limited to the embodiments disclosed herein. The present disclosure is intended to embrace various modifications and equivalent arrangements comprised in the spirit and scope of the appended claims. The scope of the appended claims accords with the broadest interpretation, thereby embracing all such modifications and equivalent structures and functions.

What is claimed is:

1. A method for a file system, wherein the file system comprises at least a first logical storage area and a second logical storage area, a logical block of the first logical storage area being different in size from that of a logical block of the second logical storage area, the method comprising:

in response to a request for creating a file, selecting, by a policy engine, a logical storage area for storing the file from the at least first logical storage area and second logical storage area, wherein selection of a logical block size of the selected logical storage area is controlled by configuring the policy engine, wherein variable-length block size is supported in the file system through use of the configurable policy engine;

storing the logical block size of the selected logical storage area in an inode associated with the file, the inode recording the logical block size for the entire file, including all logical blocks of the file; and storing the file in the selected logical storage area.

2. The method according to claim 1, wherein a storage area for storing the file is selected from the at least first logical storage area and second logical storage area based on a pre-defined parameter.

3. The method according to claim 2, wherein the pre-defined parameter is a file type and/or a file size.

4. The method according to claim 3, wherein the file types comprise at least one or more of video files, audio files, image files, content files, information files, data files and text files.

5. The method according to claim 1, wherein storing the file in the selected logical storage area further comprises:

selecting a location for storing the file in the selected logical storage area;

allocating a physical storage block with a corresponding size from a physical storage pool; and writing the file contents into the physical storage block.

6. The method according to claim 5, wherein the file system further comprises a mapping table for recording a relationship between the logical storage area and the physical storage block.

7. The method as claimed in claim 5, wherein storing the file in the selected logical storage area further comprises:

updating a block map table based on the relationship between the logical storage area and the physical storage block.

8. The method as claimed in claim 5, wherein storing the file in the selected logical storage area further comprises:

updating a block map table based on the relationship between the logical storage area and the physical storage block.

9. A system, comprising:

a data storage system; and computer-executable program logic encoded in memory of one or more computers enabled to implement a file system comprising at least a first logical storage area and a second logical storage area, wherein a logical block of the first logical storage area being different in size from a logical block of the second logical storage area, wherein the computer-executable program logic is configured for the execution of:

in response to a request for creating a file, selecting, by a policy engine, a logical storage area for storing the file from the at least first logical storage area and second logical storage area, wherein selection of a logical block size of the selected logical storage area is controlled by configuring the policy engine, wherein variable-length block size is supported in the file system through use of the configurable policy engine;

storing the logical block size of the selected logical storage area in an inode associated with the file, the inode recording the logical block size for the entire file, including all logical blocks of the file; and storing the file in the selected logical storage area.

10. The system according to claim 9, wherein the computer-executable program logic is configured for the execution of:

selecting a storage area for storing the file from the at least first logical storage area and second logical storage area based on a pre-defined parameter, and wherein the predefined parameter is a file type and/or a file size, and wherein the file type comprise at least one or more of video files, audio files, image files, content files, information files, data files and text files.

11. The system according to claim 9, wherein the computer-executable program logic is configured for the execution of:

selecting a location for storing the file in the selected logical storage area;

allocating a physical storage block with a corresponding size from a physical storage pool; and writing the file contents into the physical storage block.

12. The system according to claim 11, wherein the file system further comprises a mapping table for recording a relationship between the logical storage area and the physical storage block.

13. The system according to claim 12, wherein storing the file in the selected logical storage area further comprises:

updating a block map table based on the correspondence relationship between the logical storage area and the physical storage block.

14. A computer program product for implementing a file system on a data storage system, wherein the file system comprises at least a first logical storage area and a second logical storage area, a logical block of the first logical storage area being different in size from that of a logical block of the second logical storage area, the computer program product comprising:

a non-transitory computer readable medium encoded with computer-executable code, the code configured to enable the execution of:

in response to a request for creating a file, selecting, by a policy engine, a logical storage area for storing the file from the at least first logical storage area and second logical storage area, wherein selection of a logical block size of the selected logical storage area is controlled by configuring the policy engine, wherein variable-length block size is supported in the file system through use of the configurable policy engine;

storing the logical block size of the selected logical storage area in an inode associated with the file, the inode recording the logical block size for the entire file, including all logical blocks of the file; and storing the file in the selected logical storage area.

15. The computer program product of claim 14, wherein the code is further configured to enable the execution of:

selecting a storage area for storing the file from the at least first logical storage area and second logical storage area based on a pre-defined parameter.

16. The computer program product of claim 15, wherein the pre-defined parameter is a file type and/or a file size.

17. The computer program product of claim 16, wherein the file types comprise at least one or more of video files, audio files, image files, content files, information files, data files and text files.

18. The computer program product of claim 14, wherein storing the file in the selected logical storage area further comprises:

selecting a location for storing the file in the selected logical storage area;

allocating a physical storage block with a corresponding size from a physical storage pool; and writing the file contents into the physical storage block.

19. The computer program product of claim 18, wherein the file system further comprises a mapping table for recording a relationship between the logical storage area and the physical storage block.

* * * * *